United States Patent [19]

Kretschmer et al.

[11] Patent Number: 4,521,139
[45] Date of Patent: Jun. 4, 1985

[54] METHOD OF REGULATING MASS STREAMS

[75] Inventors: Horst Kretschmer; Guenter Tietze; Juergen Noack; Hans-Joachim Schweigel; Manfred Schingnitz; Klaus Werner, all of Freiberg; Bernd Kirsch, Hoyerswerda, all of German Democratic Rep.

[73] Assignee: Brennstoffinstitut Freiberg, Freiberg, German Democratic Rep.

[21] Appl. No.: 399,989

[22] Filed: Jul. 19, 1982

[30] Foreign Application Priority Data

Jul. 17, 1981 [DD] German Democratic Rep. ... 231889

[51] Int. Cl.³ .............................................. B65G 51/02
[52] U.S. Cl. ....................................... 406/19; 406/142
[58] Field of Search ............... 406/138, 141, 142, 143, 406/144, 197, 12, 14, 19, 10

[56] References Cited

FOREIGN PATENT DOCUMENTS

| | | |
|---|---|---|
| 1030257 | 5/1958 | Fed. Rep. of Germany ...... 406/142 |
| 2554565 | 6/1977 | Fed. Rep. of Germany . |
| 2902911 | 7/1980 | Fed. Rep. of Germany . |
| 147188 | 3/1981 | German Democratic Rep. . |
| 147933 | 4/1981 | German Democratic Rep. . |
| 557017 | 6/1977 | U.S.S.R. .............................. 406/142 |

Primary Examiner—Jeffrey V. Nase
Assistant Examiner—L. E. Williams
Attorney, Agent, or Firm—Michael J. Striker

[57] ABSTRACT

A method of adjusting the mass stream and flow density of a finely divided, fine-grained solid fuel is described. The method uses a dosing container having a fluidized bed at its bottom part and into which the solid fuel is charged above the fluidized bed. A fluidizing gas is adjustably fed to the bottom part of the container and a compensation gas is fed to the upper part of the latter. Mass stream parameters and density are measured in the discharge or supply pipe communicating with the fluidizing bed and the required weight of flow of the fluidizing gas is computed by a computer. In this manner, the regulation of the mass stream is effected by adjusting the loose density of the charge of the dusty material in the container.

7 Claims, 2 Drawing Figures

METHOD OF REGULATING MASS STREAMS

BACKGROUND OF THE INVENTION

The present invention relates in general to regulation of mass streams of finely divided and fine-grained solid fuel which are pneumatically conveyed at an arbitrary concentration of solid particles and at an arbitrary pressure to gasifying reactors or to burners of heaters and steam boilers.

Known technical solutions for the regulation of mass streams of the aforedescribed type comprise generally the following process steps:

withdrawing or discharging the pulverized solid material from a storage bin or dosing vessel with or without a fluidizing bed, by regulating pressure or by means of throttling devices;

diluting the dosed solid material to a minute concentration of solid particles (less than 10 kg/m$^3$) so as to make the evaluation of the mass stream by measurement possible.

Due to the absence of reliable measuring methods for two-phase streams having an arbitrary concentration of solid particles, and due to the absence of knowledge technologically unambiguous controllability of the density of the mass stream to be dosed, excessively complicated regulating processes were necessary, and the determination of the mass stream rate took place in the region of maximum rarification (German Pat. Nos. 2,554,565 and 2,902,911).

From the DD Pat. No. 147,188 a regulating method of a mass stream by means of a fluidizing gas in the dosing container is described. This known method, however, has the disadvantage that, particularly in the case of strong weight rate of flow, an excessive mutual influence between the density and the mass stream takes place.

Another known method according to DD Pat. No. 147,933 uses regulating throttles before the intake of the mass stream of solid particles into the supply pipe. This known method, however, has a relatively small regulating range, and in the case of high concentrations of the solid material and at low weight rate of flow, the mass stream due to shock effects may undergo retardation or non-uniformity of its flow.

SUMMARY OF THE INVENTION

It is therefore a general object of the present invention to overcome the aforementioned disadvantages.

More particularly, it is an object of this invention to provide an improved regulating method of the density and mass stream rates of finely divided solid fuels which is not possessed of these disadvantages.

An additional object of this invention is to provide a reliable regulation and monitoring during the pneumatic conveying of the mass stream.

Furthermore, an object of the invention is to provide improved dosing of the dusty solid fuels even at high concentration of solid particles.

In keeping with these objects, and others which will become apparent hereafter, one feature of the invention is based on a known, recently developed measuring method for the determination of mass stream rates, namely the injection method and the measurement of the time of transit on the basis of impressed density changes and new method of regulating mass streams in pneumatic conveying lines at arbitrary concentration of solid particles and system pressure has been found.

The essential interrelation between gas and solid dust particles, both in the heap in a storage container and in the flow condition, are to be balanced in such a manner as to achieve a simple and unambiguous regulating value from which the regulation process can be deduced.

According to this invention, a well-defined relation between a volume of dusty solid fuel discharged from a dosing container, and a gas volume fed into the dosing container is derived under consideration of the desired flow density $\rho_{fl}$ in the supply pipe. It was found and proved that, starting from the loose density $\rho_s$ of the solid dusty material in the dosing container above a fluidized bed, a specific amount $\dot{V}_{G(N)}$ has to be applied in the fluidizing bed in the dosing container in order to obtain the desired flow density $\rho_{fl}$ in the stream for a predetermined mass stream $\dot{m}_K$.

The amount of fluidizing gas and the densities of gas are computed from the following equations:

$$\dot{V}_G = \dot{m}_K \frac{(\rho_K - \rho_G)(\rho_S - \rho_{fl})}{\rho_K (\rho_S - \rho_G)(\rho_{fl} - \rho_G)} \quad (1)$$

$$\dot{V}_G = \dot{V}_{G(N)} \cdot \frac{p_N}{p} \cdot \frac{T}{T_N} \quad (1.1)$$

$$\rho_G = \rho_{G(N)} \cdot \frac{p}{p_N} \cdot \frac{T_N}{T} \quad (1.2)$$

in which

T is the temperature in the dosing container;

p is the pressure in the dosing container;

$\dot{V}_G$ is the measured value of the fluidizing gas stream related to an operational condition;

$\dot{V}_{G(N)}$ is the measured amount of fluidizing gas related to the normal condition;

$\rho_S$ is the loose or bulk density value of the finely divided fuel particles in the dosing container;

$\rho_K$ is the grain density of the dusty solid fuel;

$\rho_G$ is the gas density in the operational condition; and $\dot{m}_K$ is the mass stream rate.

In the steady-state operational condition, a partial whirling layer is formed in the lower part of the dosing container, inasmuch as the entire amount of fluidizing gas is discharged from the dosing container together with the stream of solid dust.

In order to compensate for the effect of dusty material charged over the fluidized or whirling layer, and to maintain the steady-state or stationary conveying condition, a so-called compensation gas $\dot{V}_{KG}$ must be supplied into the dosing container so as to regulate the mass stream. The amount of compensation gas can be computed from the following equations $$\dot{V}_{KG} = \frac{\dot{m}_K}{S} \quad (2)$$

$$\dot{V}_{KG(N)} = \dot{V}_{KG} \cdot \frac{p}{p_N} \cdot \frac{T_N}{T} \quad (2.1)$$

in which:

N is the value for a standard condition, and $\dot{V}_{KG}$ is the amount of compensation gas related to an operational condition.

In this manner, the regulation of mass stream can be reduced to a simple regulation of a single variable $\dot{V}_{KG}$. The amount $\dot{V}_G$ of the fluidizing gas is computed from equation (1) for the desired value $\dot{m}_{KS}$ of the stream rate and $\rho_{fl S}$ for the density and at constant values $\rho_{G(N)}$, $\rho_K$, $\rho_S$ by means of a microprocessor and the computed result is applied to a regulator for the fluidizing gas so that the amount of the latter is adjusted accordingly. It is true that, in the case of variations of the mass stream, the flow density $\rho_{fl}$ also varies; nevertheless, it is forcibly or positively stabilized upon the readjustment of the mass stream by means of the compensation gas. The compensation gas is fed into the upper part of the dosing container above the heap of the loose fuel material, or when the container is constantly in a filled-up condition, it is supplied into the container via a bucket valve communicating with the upper part of the container via a chute.

By regulating flow density $\rho_{fl}$ the latter can be maintained constant in spite of changes or variations in the mass flow. Nevertheless, this adjustment offers no additional advantages, and apart from additional expenditures it may lead to influencing the regulating process.

This regulating possibility is applicable for large power outputs per unit where the minimum diameter of the supply pipe and the minimum conveying speed depending on the diameter ensure a continuous dosing action (pipe diameter larger or equal to 10 mm, and minimum speed larger than or equal to 3 m/sec for a dense stream of lignite dust); it is also applicable for systems employing more or multiple supply pipes of constant conveying characteristics and requiring a constant conveying output.

In the case of small unit outputs, where even at small cross sections of the supply pipes, or by selecting a larger cross section of the pipe where falling below the minimum conveying speed at which critical conveying state will occur, and in the case of a plurality of supply pipes of different conveying output, the regulation of the mass stream as well as the increase of conveying velocity in the supply pipes must be achieved, whereby the resulting mass stream is dense.

In the aforedescribed second variation of the regulating process, a differential pressure PdCl between the dosing container and the reactor is kept constant by the compensation gas $\dot{V}_{KG}$ supplied into the container. This differential pressure PdCl must exceed that which is required for the maximum mass stream. The throttling of the mass stream $\dot{m}_{Ki}$ in each supply pipe i is carried out by means of an amount of control gas $\dot{V}_{SG}$ admixed via a mixing apparatus into the supply pipe depending on a regulating value determined from the comparison of the actual value and the desired value of the mass stream rate. The admixture of control gas $\dot{V}_{SG}$ can also be utilized for the determination of the mass stream according to the known injection method, whereby always a certain basic load $\dot{V}_{SG}$ must be available even at maximum conveying output in order to ensure proper measurement of the mass stream and to prevent falling below a critical minimum conveying velocity $V_S$. In this mode of regulation or adjustment it is of advantage when the flow density $\rho_{fl}$ is set relatively high up to the point of measurement of the mass stream in order to obtain a high measuring accuracy. In the mixing pipe for the control gas, a large density variation $\rho_{fl}$ to $\rho_{f2}$ is obtained, while in spite of this variation a high density of the stream is maintained. For this reason it is also of advantage when the fluidizing gas $V_G$ is not measured according to flow density $\rho_{fl}$, inasmuch as at a high flow density the amount of fluidizing gas may easily drop to zero and cause a critical flow density. For this reason, a guiding magnitude according to the equation (1) is figured out so that a fluidizing action in the dosing container always takes place.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
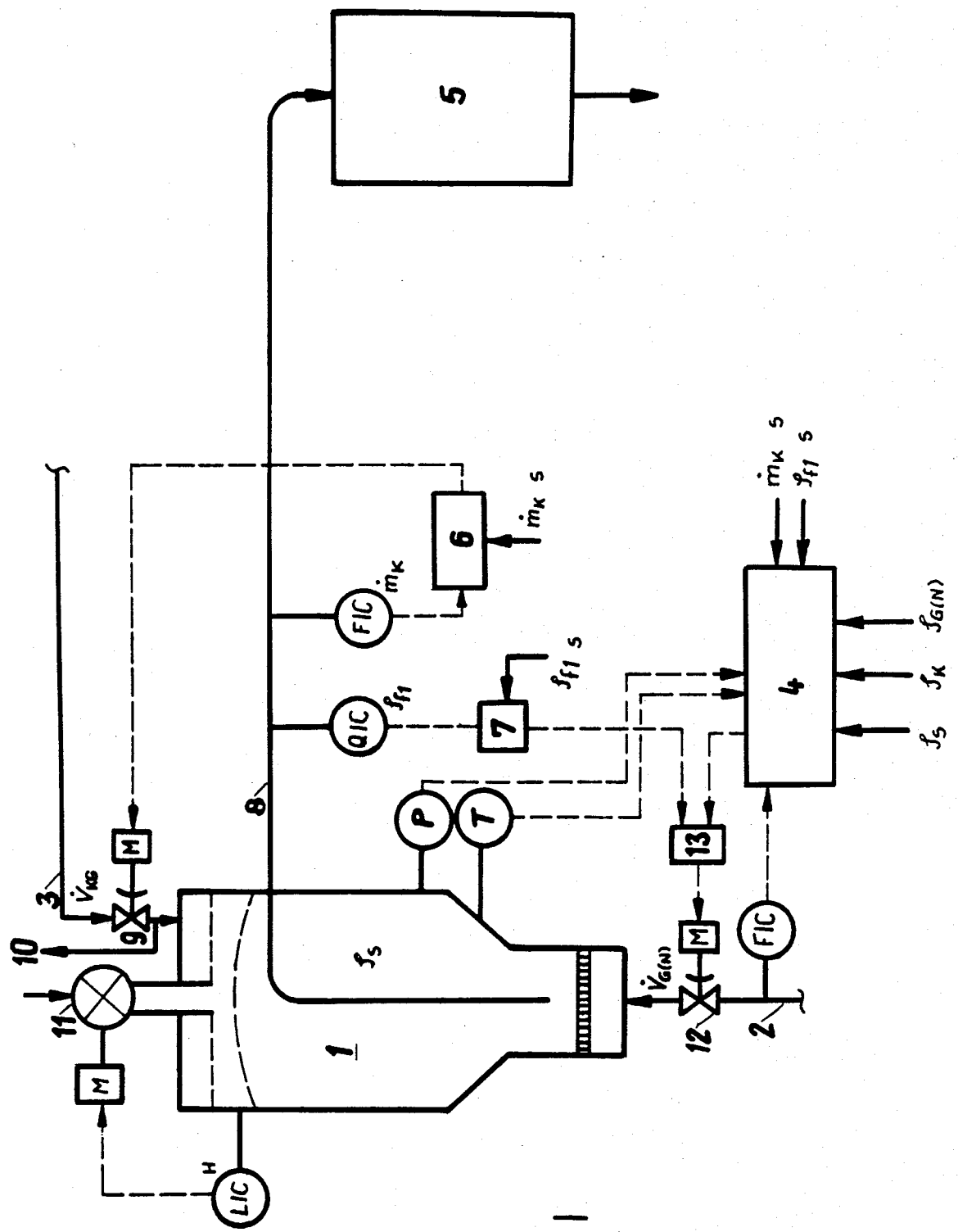
FIG. 1 is a simplified block diagram of an arrangement for adjusting mass streams by means of a compensation gas.

Referring firstly to FIG. 1, there is illustrated a dosing container 1 provided at its top part with a bucket valve 11 communicating with the interior of the container by a chute. In the bottom part of container 1 a fluidizing bed is provided and is supplied by a fluidizing gas from conduit 2. A supply pipe extends from the region of fluidizing bed in container 1 to a gasifying reactor 5.

In one example, it is desired to regulate the mass stream of 30,000 kg/hour of lignite dust of a heap or loose density of $\rho_S = 500$ kg/m$^3$ and a grain density $\rho_K = 1,400$ kg/m$^3$ and stored in the dosing container 1. The level of charge of the coal dust in container 1 is sensed by a sensor LIC and controlled by the bucket valve 11 so as to be maintained constant. The mass stream conveyed through the supply pipe or conduit 8 into the gasifying reactor 5 is to be regulated between 30 and 100%. The optimum flow density of the conveyed stream is $\rho_{fl} = 300$ kg/m$^3$. Fluidizing gas 2 supplied through conduit 2 and compensation gas supplied to the top of the container 1 via conduit 3 is nitrogen of standard density $\rho_{G(N)} = 1.25$ kg/m$^3$; the operational conditions in the dosing container 1 are defined by pressure p = 3.0 MPa and temperature T = 293° K. Measuring devices are located immediately at the outlet from the dosing container 1.

A microprocessor or computer programmed to compute the guiding values according to aforedescribed equations, (1.1) and (1.2) determines, depending on the latitude of regulation of the mass stream, the amount of fluidizing gas $\dot{V}_{G(N)}$ to be for example between 383 and 1,277 m$^3$/hour. A selector switch 13 is connected to the output of the microprocessor 4 to or via flow density meter QIC and density regulator 7 to supply pipe 8 and, depending on the selected setting, control a regulating valve 12 in the conduit 2 in response to the computed amount of the fluidizing gas stream, or the flow density in pipe 8 or according to fixed value.

The aforedescribed equation (2) and (2.2) determine a required opening of valve 9 for the compensation gas supplied through conduit 3. For example, the flow rate of the compensation gas $\dot{V}_{KG(N)} = 487$ to 1,624 m$^3$/hour. The compensation gas can be applied through pipe 10 and bucket valve 11 into the upper part of dosing container 1. The adjustment of the compensation gas $\dot{V}_{KG}$ is effected by regulator 6 and regulating valve 9 under the application of regulating and measuring valves $\dot{m}_K$ and $\dot{m}_{KS}$.

Figure 2:
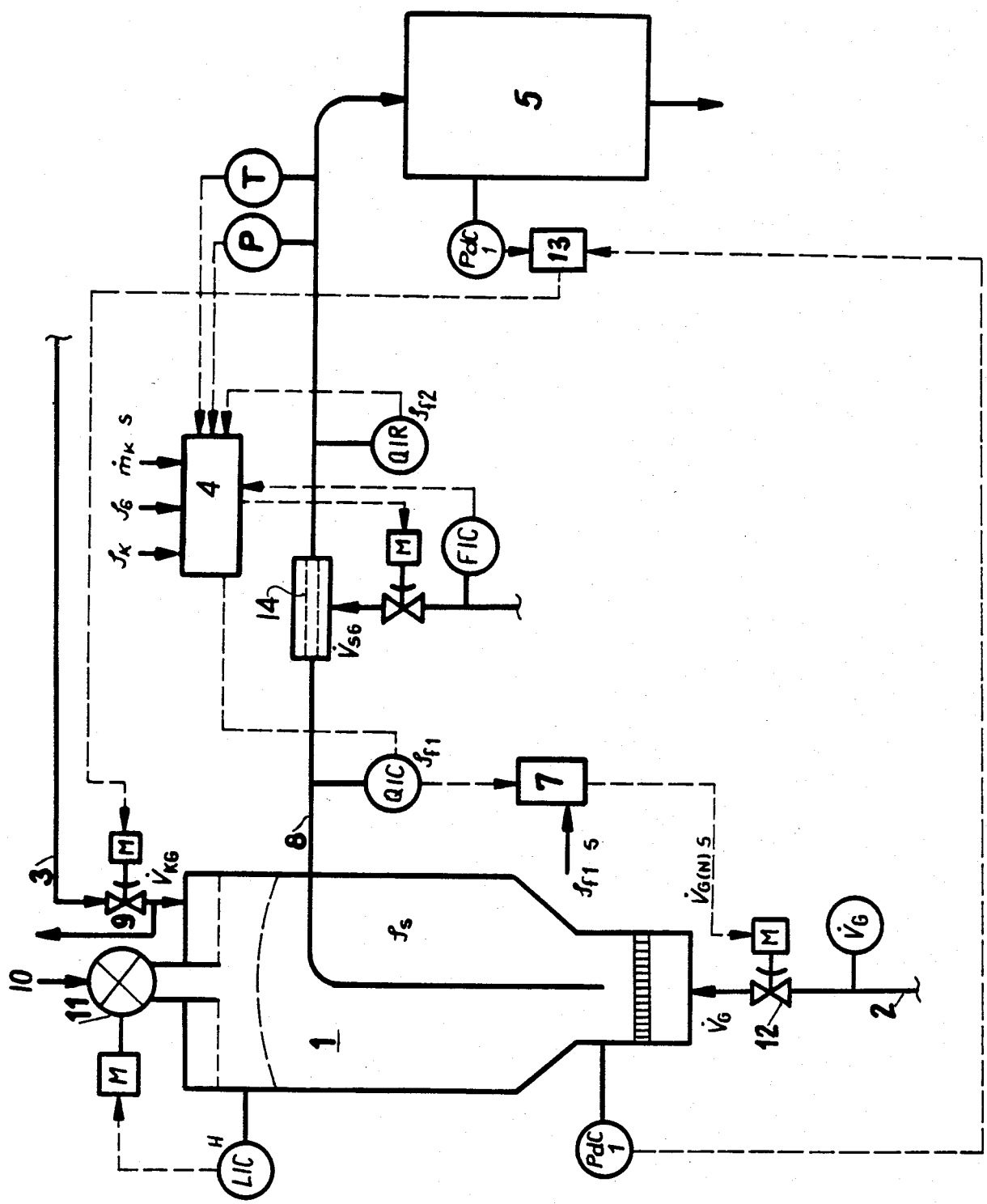
FIG. 2 is a modification of the arrangement of FIG. 1 in which the regulation of the mass streams is effected by a control gas.

In the example of the method of this invention according to FIG. 2, it is desired to pneumatically convey 800 kg/hours of lignite dust through the supply pipe 8 having a clearance of 14 mm and connecting the dosing container 1 to a heater 5. The conveying medium is air ($\rho_{G(N)} = 1.293$ kg/m$^3$) at an overpressure of 0.2 MPa and a temperature of 293° K. The loose or bulk density of the lignite dust in the container is $\rho_S = 500$ kg/m$^3$, the grain density $\rho_K = 1,400$ kg/m$^3$. The flow density after the mixing apparatus 6, which is connected in series with the supply pipe 8, has been set with respect to the low cross section of the supply pipe to be $\rho_{f2} = 269$ kg/m$^3$. Since the employed computer 4' has also determined the mass stream $\dot{m}_K$, of flow density $\rho_{f1}$ of 400 kg/m$^3$ before the mixing apparatus 14 is adjusted by means of regulating valve 12 for the fluidizing gas in conduit 2. The conveying velocity $v_S$ before the mixing apparatus 14 is 3.6 meters per second, and after the mixing apparatus amounts to 5.6 m/s. By changing the flow rate of the control gas $\dot{V}_{SG}$ to the mixing apparatus 14, the mass stream rate $\dot{m}_K$ can be either increased or reduced. The required amount of compensation gas $\dot{V}_{KG}$ in conduit 3 for maintaining a constant difference pressure PdC1 between the dosing container 1 and the heating device 5 is supplied into the container 1 through the pipe 10. As mentioned before, the charged condition in the dosing container 1 is sensed by a charge feeler LIC and controlled by the bucket valve 11 so that the level of the loosely charged dusty material is kept constant. The value of the difference pressure PdC1 is determined from the maximum mass stream and the length of the supply pipe.

It will be understood that each of the elements described above, or two or more together, may also find a useful application in other types of constructions differing from the types described above.

While the invention has been illustrated and described as embodied in specific examples of pneumatic conveying systems, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, form the standpoint of prior art, fairly constitute essential characteristics of the generic or specific aspects of this invention.

We claim:

1. A method of regulating a continuous mass stream of a finely divided, fine-grained solid fuel which is conveyed pneumatically at an arbitrary concentration and pressure from a closed dosing container through a supply pipe to a gasification reactor or a burner of a heater or steam boiler, comprising the steps of charging the solid fuel into the closed dosing container to create therein a charge of a bulk density $\rho_S$; forming a fluidized bed in the charge near the bottom part of the container by means of supplying a fluidizing gas $\dot{V}_G$; feeding a compensation gas $\dot{V}_{KG}$ into a part of the container which is remote from the fluidized bed; discharging a mass stream of the solid fuel with a mass stream rate $\dot{m}_K$ from the fluidized bed through the supply pipe; maintaining the flow density $\rho_{f1}$ of the mass stream in the supply pipe at a costant required value by regulation the fluidizing gas $\dot{V}_G$ depending upon the required flow density $\rho_{f1}$; and regulating of the mass stream rate $\dot{m}_K$ in the supply pipe by adjusting the compensation gas $\dot{V}_{KG}$ according to the equation $$\dot{V}_{KG} = \frac{\dot{m}_K}{S}.$$

2. A method as defined in claim 1, wherein the flow density $\rho_{f1}$ of the mass stream in the supply pipe is maintained at a constant required value by regulation of the fluidizing gas $\dot{V}_G$ depending upon the required flow density $\rho_{f1}$ according to the equation $$\dot{V}_G = \dot{m}_K \frac{(\rho_K - \rho_G)(\rho_S - \rho_{f1})}{\rho_K(\rho_S - \rho_G)(\rho_{f1} - \rho_G)},$$

$\rho_G$ being the density of the gas in the said container measured at the pressure and the temperature conditions therein, and $\rho_K$ the grain density of the solid fuel.

3. A method as defined in claim 1, wherein the desired flow density $\rho_{f1}$ in the supply pipe is continuously sensed by a flow density measuring probe and the flow of the fluidizing gas is continuously regulated so as to compensate for any density fluctuations by varying the mass stream.

4. A method as defined in claim 1, further comprising the steps of maintaining a constant difference pressure between the container and the gasification reactor or burner so as to get a required maximum mass stream rate $\dot{m}_K$; mixing the mass stream at a mixing point in the supply pipe with a control gas stream $\dot{V}_{SG}$ being fed to the supply pipe; adjusting a required mass stream rate $\dot{m}_K$ below the said maximum mass stream rate by varying the control gas stream $\dot{V}_{SG}$ inverse proportionally to the desired varying of the mass stream rate $\dot{m}_K$.

5. A method as defined in claim 4, wherein a plurality of n supply pipe communicates with the region of the fluidized bed in the container, and wherein the mass stream in at least one supply pipe i of the supply pipe n is mixed with a control gas stream $\dot{V}_{SG}$ which is being fed to the supply pipe i with a mass stream rate $\dot{m}_{Ki}$.

6. A method as defined in claim 5, wherein the compensation gas $\dot{V}_{KG}$ is adjusted according to the equation $$\dot{V}_{KG} = \frac{\dot{m}_K}{\rho_S}$$

wherein $\dot{m}_K$ is the (total) mass stream rate, defined as the sum of mass streams through all supply pipes n.

7. A method as defined in claims 2 or 5, wherein the required flow density $\rho_{f1}$ of the mass streams in the supply pipes upstream of the mixing point is maintained at a constant value which is higher than an allowable minimum flow density, by regulation of the fluidizing gas $\dot{V}_G$, the latter depending upon the required flow density $\rho_{f1}$ according to the equation $$\dot{V}_G = \dot{m}_K \frac{(\rho_K - \rho_G)(\rho_S - \rho_{f1})}{\rho_K(\rho_S - \rho_G)(\rho_{f1} - \rho_G)},$$

wherein $\dot{m}_K$ is the (total) mass stream rate, defined by the equation $$\dot{m}_K = \sum_{i=1}^{i=n} \dot{m}_{Ki}$$

as the sum of the mass stream rates $\dot{m}_{Ki}$ of the supply pipes i of the said plurality of supply pipes.

* * * * *